US008549658B2

(12) United States Patent
Kolavennu et al.

(10) Patent No.: US 8,549,658 B2
(45) Date of Patent: Oct. 1, 2013

(54) PROVISIONING CREDENTIALS FOR EMBEDDED WIRELESS DEVICES

(75) Inventors: Soumitri N. Kolavennu, Blaine, MN (US); Datta Godbole, Plymouth, MN (US); Wendy Foslien Graber, Woodbury, MN (US)

(73) Assignee: Honeywell International Inc., Morristown, NJ (US)

( * ) Notice: Subject to any disclaimer, the term of this patent is extended or adjusted under 35 U.S.C. 154(b) by 107 days.

(21) Appl. No.: 13/186,114

(22) Filed: Jul. 19, 2011

(65) Prior Publication Data
US 2013/0024685 A1 Jan. 24, 2013

(51) Int. Cl.
*G06F 21/20* (2006.01)
*G06F 21/06* (2006.01)

(52) U.S. Cl.
USPC .............................. 726/34; 726/21

(58) Field of Classification Search
None
See application file for complete search history.

(56) References Cited

U.S. PATENT DOCUMENTS

| 2005/0148326 A1 | 7/2005 | Nogawa et al. |
| 2011/0211219 A1 | 9/2011 | Bradley et al. |

OTHER PUBLICATIONS

Localization in Wirelss Sensor Networks. Huseth et al. Springer Science+ Business Media. 2011.*
TXU Energy iThermostat Manager Online User Manual. May 28, 2009.*
Radio Thermostat. 2009.*
"European Application Serial No. 12175131.7, European Search Report mailed Oct. 29, 2012", 4 pgs.
"Extend Your AirPort Wireless Network with an AirPort Express", [Online]. © iClarified. [retrieved on Oct. 17, 2012]. Retrieved from the Internet: <http:www.iclarified.com/entry.index.php?enid=963>, (Apr. 17, 2008), 4 pgs.
"European Application Serial No. 12175131.7, Communication Pursuant to Art. 94(3) mailed Nov. 27, 2012", 4 pgs.

\* cited by examiner

*Primary Examiner* — Venkat Perungavoor
(74) *Attorney, Agent, or Firm* — Schwegman, Lundberg & Woessner, P.A.

(57) ABSTRACT

A system and method are used to connect an installed device to a local premise network, such as a home network provided by a router in the home. A user may use a host device, such as a mobile telephone that is already connected to the home network to provide the home network credentials to the installed device without having to enter the home network credentials manually into the installed device such as a thermostat.

20 Claims, 3 Drawing Sheets

PROVISIONING CREDENTIALS FOR EMBEDDED WIRELESS DEVICES

BACKGROUND

With the proliferation of wireless networks, many devices are being designed with electronics to connect to wireless networks. For a wireless enabled device to connect to a network, the devices usually include a user interface to facilitate entry of network credentials by a user. However, for many devices, there is a desire to provide minimal or no interface with which to enter the credentials. Even when such an interface is provided, it can be cumbersome for a user to obtain and enter the information. Further devices may use WPS capabilities, which deal with provisioning WiFi network credentials. Such capabilities must be included in the hardware, such as router, providing the network.

SUMMARY

A system and method are used to connect an installed device to a local premise network, such as a home network provided by a router in the home. A user may use a host device, such as a mobile telephone that is already connected to the home network to provide the home network credentials to the installed device without having to enter the home network credentials manually into the installed device such as a thermostat.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, and the scope is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
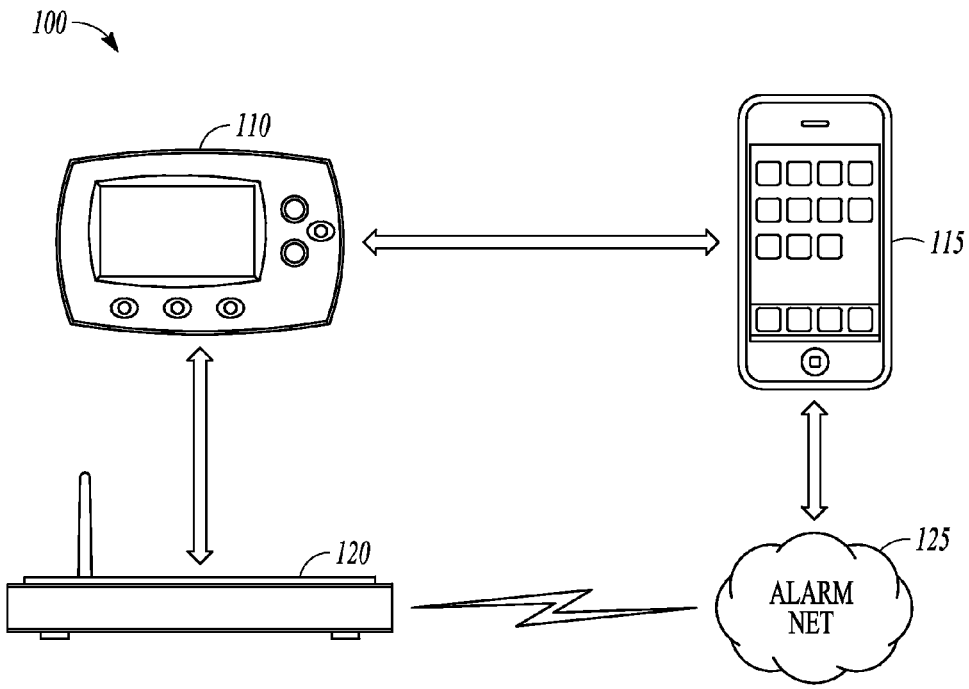
FIG. 1 is a block diagram of a system to provision network credentials to a device with an embedded network device according to an example embodiment.

FIG. 1 is a block diagram of an example system 100 that includes an installed device 110, a host device 115, and a local premise network router 120. The installed device, such as a thermostat, may include an embedded network device in one embodiment that is capable of connecting to other devices in a wireless manner, such as via a WiFi network or any other type of network. Such embedded devices allow communication with and control of the installed device 110 via remote devices or services.

Host device 115 in one embodiment is a mobile device such as a smart phone, laptop computer, pad, or other device, including a fixed device such as a desktop computer. Host device 115 is capable of connecting to various networks, including the local premise network router 120 when the host device is close enough to the router 120 to connect. The router in one embodiment is adapted for use in a dwelling or small business to provide a local premise wireless network. Host device 115 may include applications, referred to as apps, that can interact with the installed device 110 via its embedded network device, and provide information regarding connecting to the router 120. System 100 may also include a service 125, represented as located in a network cloud, such as the internet. Service 125 may be an application that provides services in support of installed devices, such as monitoring and communication services. One example service is Alarm-Net Services by Honeywell International Inc.

Figure 2:
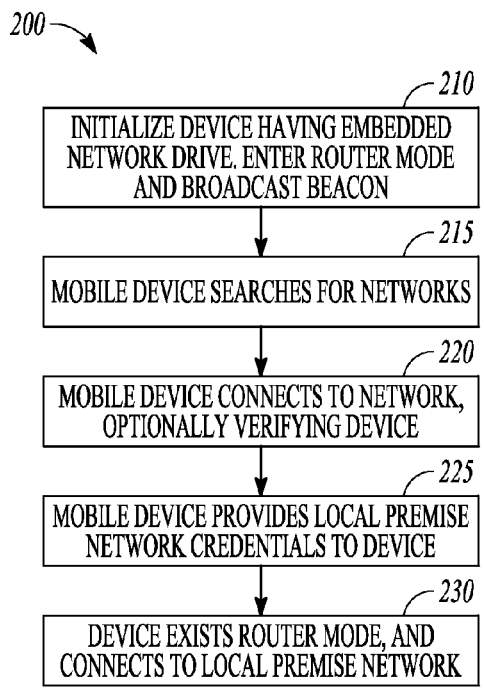
FIG. 2 is a flowchart illustrating an example method of provisioning network credentials in the system of FIG. 1.

In one embodiment, the installed device 110 is installed on a wall in a home or business within range of the router 120. It may be plugged into a power source, or powered by a battery. In one embodiment, the devices of system 100 perform a method 200 indicated in the flowchart of FIG. 2. Methods performed by the individual devices are described following the overall method implemented by the system 100. This is followed by block diagrams of the installed device 110 and host device 115.

When the installed device 110 is powered on or when a configuration button is pushed, the embedded network device is initialized at 210 and enters a mode where the embedded network device in the installed device 110 acts as a router, and provides a beacon broadcasting a predefined installed device network name, such as "HON_STAT" in the case of the installed device 110 being a thermostat.

In further embodiments, the device network name may or may not have a name representative of the installed device 110. Other example installed devices 110 include but are not limited to a security keypad, and general home automation such as lighting control, door locks, entertainment system and even a connection to an electric meter. The meters may then use a WiFi connection instead of a low rate wireless personal area network such as a Zigbee® network, and may be commissioned to the network as described herein.

In some embodiments, the installed device 110 may begin intermittently broadcasting the beacon when installed. The beacon may be triggered by providing power, or by a person pressing a button on the installed device, such as an initialization button, or by pressing any other button on the installed device in further embodiments. In some embodiments, the beacon may provide further information regarding the installed device, such as model and configuration information.

A user within range of the installed device 110 may now use the host device at 215, which searches for nearby networks and finds the network name broadcast by the installed device. In some embodiments, an app is selected by the user after initializing the installed device. The app running on the host device is used to initiate detection and connection to the installed device which is acting as a router. The app, referred to as a provisioning app in one embodiment, recognizes the installed device network name, and connects to the installed device network at 220. A password may be included with the app to allow the connection to enhance security in one embodiment. In further embodiments, the host device may check with the service 125 to ensure that the credentials and possibly other information provided by the installed device indicate that the installed device is safe to connect to. In some embodiments, an encryption key or keys may be utilized to encrypt communications between the host device and the installed device.

At 225, the host device, now connected to the installed device network, provides the local premise network credentials to the installed device. The credentials and other information may be provided in the form of a UDP/TCP message in some embodiments. The credentials include an identifier of the local premise network, and a password in one embodiment, but may also include WEP/WPA/WPA2 key or even a device certificate. As indicated above, the credentials may be encrypted in some embodiments to provide enhanced security.

At 230, the installed device receives the credentials and exits from router mode. The installed device now enters a client mode, where it searches for the local premise network and connects to it when found using the host device provided credentials. The installed device is now connected to the local premises network and is able to access other devices and networks coupled to the local premises network by router 120. Host devices are now able to access the installed devices. This may include in some embodiments, the host device 115 via the local premises network, or with the host devices coupled to some other network that can be accessed via the router 120, which may be coupled to an internet service provider or other type of public or private network.

Figure 3:
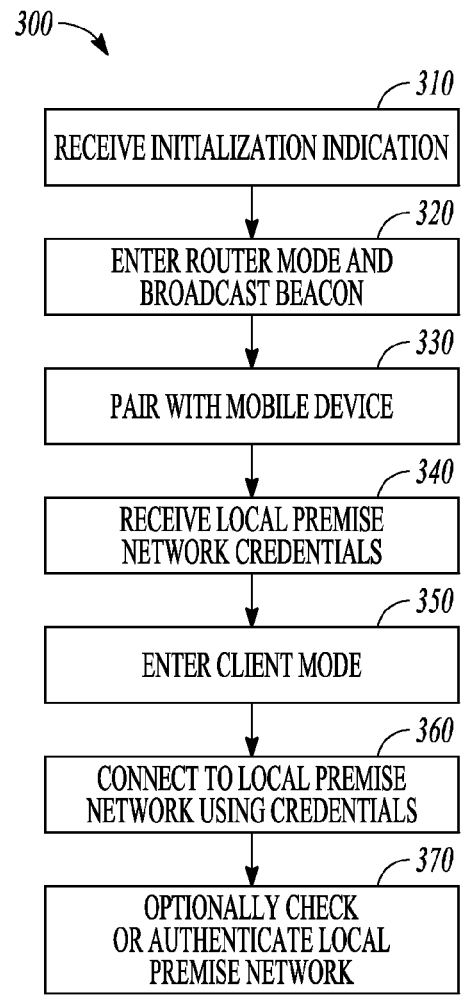
FIG. 3 is a flowchart illustrating a method of an installed device being provisioned with network credentials according to an example embodiment.

FIG. 3 is a flowchart of an example method 300 implemented by the installed device 110 or other device having an embedded network device. When the installed device 110 is powered on or when a configuration button is pushed, the embedded network device receives an initialization indication as indicated at 310. The embedded device enters a router mode and then broadcasts a beacon with installed device network connection information at 320, in essence, turning into an access point or router. The connection information may include an identifier of the embedded device, such as an SSID (Service Set Identifier IEEE 802.11). The embedded device also auto configures an IP (Internet Protocol) address in one embodiment, and listens on a selected local port. The embedded device then receives credentials from a host device via the selected local port, and pairs with the host device at 330 over the installed device network. At 340, the embedded device receives local premise network credentials, such as the address and password information corresponding to the router 120. In some embodiments, further information, such as application specific information, is received. This information may be preconfigured with the provisioning app, or may be entered by a user as prompted by the application. In one embodiment, the specific information may be related to initial desired settings of the installed device.

In one embodiment, a pre-established and secret encryption key may be used for the transfer of information between the host device and the embedded device. The use of such a key prevents other devices from eavesdropping on the transactions and learning the network credentials.

At this point, the embedded device disconnects from the installed device network and the host device and enters into a client mode at 350. At 360, the embedded device uses the local premise network credentials to pair with or otherwise connect to the local premise network of router 120. An optional check 370 may also be made to the remote service (e.g. AlarmNet) directly by the host device to confirm that the local premise network 120 can be trusted. This check can be done via the installed device network through the host device, or may be done via the local premise network prior to performing other functions which may not be permitted when connected to a non-authenticated network.

Once paired with the router 120, the installed device can access the service 125, and even communicate via the router 120 to the host device to provide information to the host device, such as setting information and temperature, in addition to allowing the host device to exercise control to program the installed device. These interactions may be direct through the router 120, or via a public network, optionally using the service 125.

Some of the services of the installed device that may be accessed remotely via router 120 include controlling set point, selecting different modes, such as vacation and away, as well as setting schedules. Many other functions and features may be accessed via the router, either by the host device, or other computing device coupled to the network directly or via a further public or private network. Such functions and features include downloading zip code information, obtaining rates from utilities, uploading data for comparison to peers, accessing weather data, and obtaining further information regarding the heating and cooling of a structure such as a home. In further embodiments, devices and services may be controlled and or offered, including baseboard heating, zoning, water heater, humidifier, diagnostics for heating and cooling devices, filter change reminders, coupons, advertising, web based shopping and orders, and many other devices may be controlled and services offered.

Figure 4:
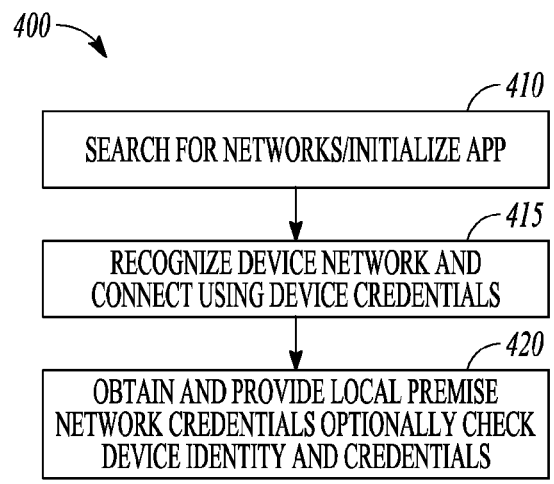
FIG. 4 is a flowchart illustrating a method of a host device transferring provisioning credentials to an installed device according to an example embodiment.

FIG. 4 is a flowchart illustrating a method 400 performed by the host device according to an example embodiment. At 410, the host device 115 searches for other networks. This may be a normal process for the host device, and is often used to connect the host device to a local premises network, such as that provided by router 120. The user usually enters the credentials of the router 120, and the host device may thereafter connect to the local premises network as desired.

In one embodiment, the provisioning app is initialized at 410 during or before the search for networks. The provisioning app searches the host device for local premise network credentials, which may already be recorded, on the host device. If not, the provisioning app may query the user for the credentials and record them.

However, once the device such as installed device 110 has been initialized and enters a router mode, the host device recognizes the installed device network at 415 by receiving the beacon broadcast by the installed device and connects using the installed device network credentials. These credentials may be provided in one embodiment by the provisioning app, which may be downloaded by the user after purchasing the installed device. In one embodiment, the packaging of the installed device, product literature, or the back of the installed device may contain a code that can be scanned by the host device and point to the app in the network where it can be downloaded. The code, such as a QR code can also be used to provide the credentials of the installed device network in one embodiment, including the SSID and encryption key, or they can be included in the downloaded app itself.

Once connected, the host device obtains and provides credentials for the local premise network on router 120 by transmitting them to the installed device 110 at 420. This function is performed by the app executing on the host device in one embodiment.

In some embodiments, the host device may optionally check the identity and credentials of the installed device via the remote service (e.g. AlarmNet) to authenticate the installed device 110 prior to providing the local premise network credentials at 420. The host device may first read or otherwise obtain the credentials, and temporarily disconnect from the embedded network device and connect to an external network to authenticate the embedded network device with a trusted third party, such as the service 125.

Figure 5:
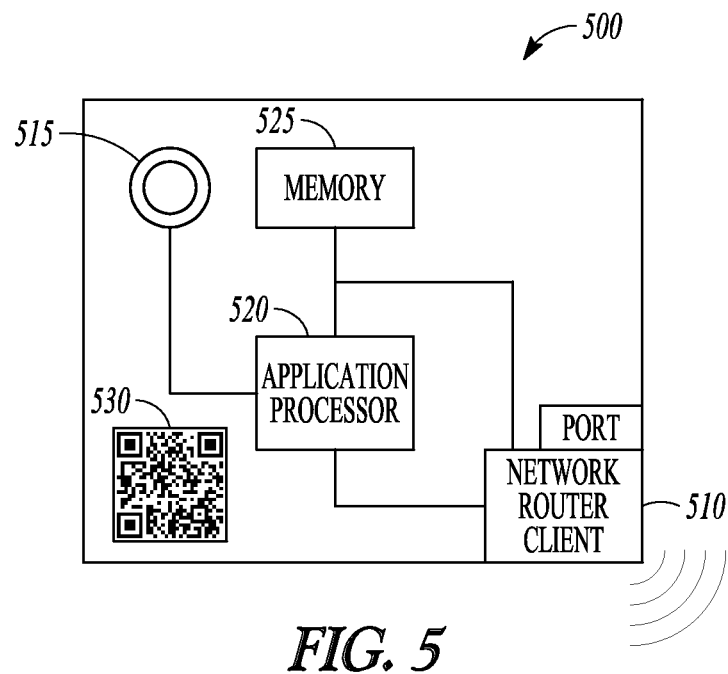
FIG. 5 is a block diagram of an installed device having an embedded network device according to an example embodiment.

FIG. 5 is a block diagram of a device 500 such as an installed device according to an example embodiment. The device 500 includes an embedded network device 510, embedded in device 500 that provides the networking functions described above. A port 515 is illustrated, corresponding to the local port that receives communications from a mobile or host device responsive to beacons broadcast by the embedded network device 510. An initialization button 515 is shown on the front of the device 500 for use by the user to initialize the device and start the process of connecting to the host device.

In one embodiment, the initialization button 515 is coupled to a processor 520 having an application for implementing the device methods and controlling the embedded network device 510. The processor 520 controls switching of the embedded network device 510 from a router function to a client function, receives input from a user via keys that are not shown, or via a network connection, sends identifying information, pairs to the local premise network, and also provide encryption functions and other functions as needed.

A memory 525 is coupled to the processor 520 and embedded device 510. Memory 525 provides the SSID, password, and WEP (wired equivalent privacy IEEE 802.11) of the router function of the embedded network device 510, and also may include an equipment ID and encryption key. Memory 525 may also store the address and password information for connection to the local premise network for use by the processor 520 in connecting. In one embodiment, the embedded network device 510 is also coupled to the memory.

Also shown in FIG. 5 is a QR code at 530, which may be encoded with information readable by a host device that includes a camera or bar code scanning capability. The QR code 530 may be located anywhere on the device 500, such as a back of the device, or in product literature associated with device 500.

Figure 6:
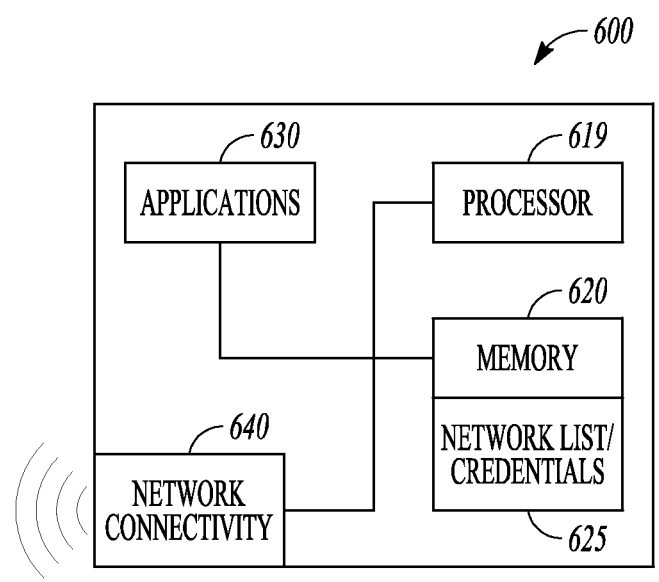
FIG. 6 is a block diagram of a host device that transfers network credentials to an installed device according to an example embodiment.

FIG. 6 is a block diagram of a host device 600, such as a smart phone, pad, laptop, or other host device having network capabilities. In some embodiments, host device 600 need not be mobile device, and may include a desk top computer system or other system built into a premise such as a home, and having suitable wireless networking capabilities.

Host device 600 includes a processor 610 and memory 620. The memory, such as random access memory or other type of suitable memory may store data 625 such as network lists and credentials for connecting to the networks in the list. Memory 620 may also include applications 630 stored either in the same memory 620 or a separate memory in various embodiments. Applications 630 may include the provisioning app described above. The applications are run on the processor 610 and control a network connectivity circuit 640 that allows the host device 600 to couple to networks in the network list 625 and provide credentials. In one embodiment, the provisioning app provides the credentials for connecting to the device 500 to the installed device network responsive to the beacon broadcasted by device 500. It also retrieves the local premise network credentials from network list 625 to provide to the device 500.

The embodiments described provide a system and method to connect and installed device to a local premise network, such as a home network provided by a router in the home. A user may use a device already connected to the network, such as a mobile telephone, laptop/desktop computer, pad type device, etc., to provide the home network credentials to the installed device without having to enter the home network credentials manually into the installed device such as a thermostat or other device. Thus, a convenient and safe way is provided to connect the thermostat or other device to the home network.

The invention claimed is:

1. A method comprising:
   initializing using a processor an installed business or home system control device having an embedded network device;
   the embedded network device broadcasting a beacon with connection information via an installed device network, thereby turning the business or home system control device into a router;
   receiving, responsive to the beacon, via a pairing with a host device over the installed device network and via at an embedded network device port in the installed business or home system control device, local premise network information from the host device;
   the embedded device entering a client mode by disconnecting from the installed device network and the host device, and searching for the local premise network; and
   connecting the embedded device to the local premise network using the local premise network information received from the host device.

2. The method of claim 1 wherein the installed device broadcasts the beacon in a router mode and provides an installed device network in the router mode prior, and exits the router mode prior to entering the client mode.

3. The method of claim 1 wherein the local premise network is provided by a router adapted for use in a dwelling.

4. The method of claim 1 wherein the installed device is a thermostat.

5. The method of claim 1 wherein the local premise network information includes a network identifier and password.

6. The method of claim 5 wherein the local premise network information is encrypted, and wherein the method further comprises decrypting the local premise network information using a key.

7. The method of claim 5 wherein the local premise network information further comprises installed device model and configuration information.

8. The method of claim 1 wherein the beacon information is broadcast responsive to an initialization button being pressed on the installed device.

9. A business or home system control device comprising:
   a processor to receive an initialization signal;
   an embedded network device to broadcast a beacon with connection information via an installed device network, thereby turning the business or home system control device into a router; and
   an embedded network device port to receive, via a pairing with a host device, over the installed device network, local premise network information from the host device;

wherein the processor causes the embedded device to enter a client mode by disconnecting from the installed device network and the host device, and searching for the local premise network; and wherein the processor causes the embedded device to connect to the local premise network using the network information received from the host device.

10. The device of claim 9 and further comprising a button to generate the initialization signal when pressed by a user.

11. The device of claim 9 wherein the embedded network device broadcasts the beacon in a router mode and provides an installed device network in the router mode prior, and exits the router mode prior to entering the client mode.

12. The device of claim 9 wherein the device is a thermostat installed in a dwelling.

13. The device of claim 9 wherein the local premise network information includes a network identifier and password and is encrypted, and wherein the processor is further programmed to decrypt the local premise network information using a key.

14. A method comprising:
  initializing using a processor an application on a host device coupled to a local premise network;
  obtaining local premise network information on the host device;
  receiving a beacon from an embedded network device of a local premise installed device, the local premise installed device comprising a business or home system control device having an installed device network, the beacon transmitted via the installed device network;
  connecting the host device to the embedded device;
  disconnecting the embedded device from the installed device network; and
  providing the local premise network information to the embedded device responsive to the beacon to allow the embedded device to connect directly to the local premise network.

15. The method of claim 14 wherein the host device is a mobile wireless device and the application is an installed device specific app that accesses credentials of the embedded network device.

16. The method of claim 15 wherein the app queries a user of the host device for the local premise network credentials.

17. The method of claim 14 wherein the local premise network information is obtained from a user previously connecting the host device to the local premise network.

18. The method of claim 14 wherein the local premise network information is encrypted by the host device using an encryption key prior to providing the local premise network information to the embedded device.

19. The method of claim 14 and further comprising authenticating an identity of the installed device prior to providing the local premise network information to the embedded device.

20. A non-transitory computer readable storage device having an app stored thereon to cause a computer to implement a method comprising:
  initializing an application on a host device coupled to a local premise network;
  obtaining local premise network information on the host device;
  receiving a beacon from an embedded network device of a local premise installed device, the local premise installed device comprising a business or home system control device having an installed device network, the beacon transmitted via the installed device network;
  connecting the host device to the embedded device;
  disconnecting the embedded device from the installed device network; and
  providing the local premise network information to the embedded device responsive to the beacon to allow the embedded device to connect directly to the local premise network.

* * * * *